Nov. 2, 1926.
A. H. TYSON
GLASS MOLDING MACHINE
Filed July 20, 1925
1,605,797
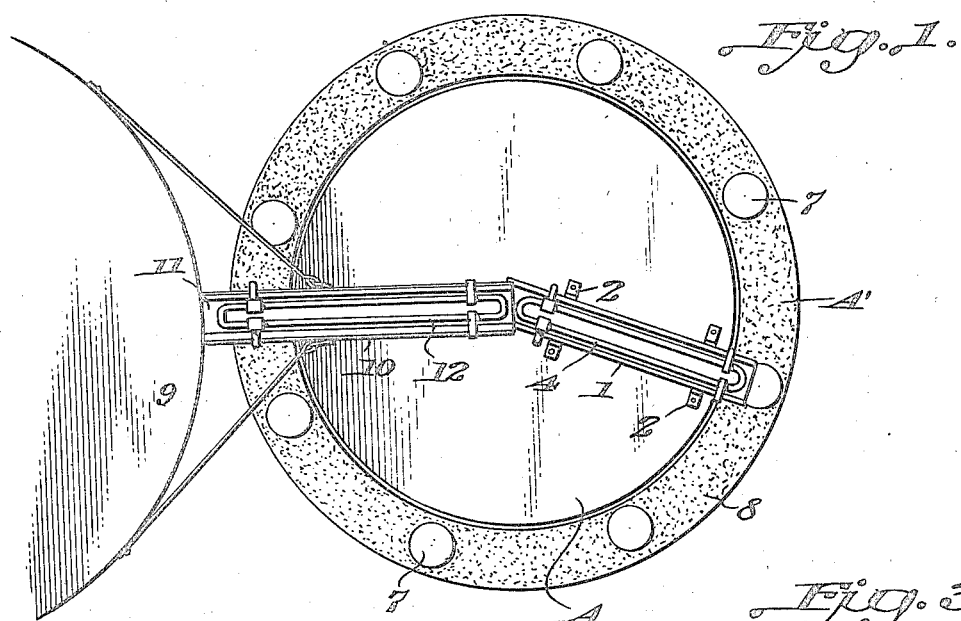
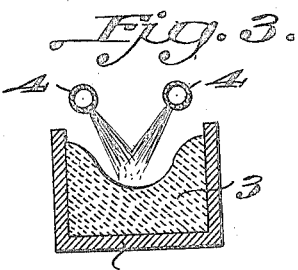
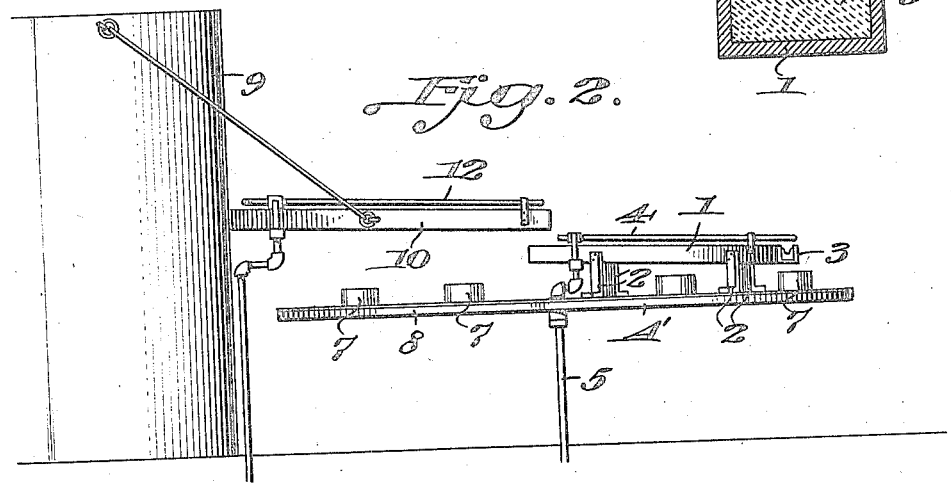
Inventor,
Andrew H. Tyson
By Vernon C. Hodges his Atty.

Patented Nov. 2, 1926.

1,605,797

UNITED STATES PATENT OFFICE.

ANDREW H. TYSON, OF WASHINGTON, DISTRICT OF COLUMBIA.

GLASS-MOLDING MACHINE.

Application filed July 20, 1925. Serial No. 44,886.

My invention relates to an improvement in glass molding machines, and is a continuation in part of my prior application, Serial No. 284,954, filed March 25, 1919.

This invention is an improvement in the feed mechanism which conveys the flowing molten stream of glass or other material from the supply tank source to the various molds of the machines to which such feedspouts may be adapted, and comprises a rotary trough for continuing the flow of molten material to the molds, instead of moving the molds and necessary accompanying heavy machinery to the supply, as heretofore.

By means of my rotary feed trough, it is easy to appreciate the lightness and ease with which such light mechanism can be moved continuously or step by step to the molds, instead of moving the said heavy machinery step by step with its molds, to the point where the glass is fed into them next to the tank; thus saving in the wear and tear on the machinery; the chief advantage, however, being the rapidity with which this light mechanism, which holds the swinging trough in position, can be moved to accomplish the quick work required of it.

In the accompanying drawings:

Fig. 1 is a plan view, of my invention;

Fig. 2 is a side elevation thereof; and

Fig. 3 is an enlarged detail transverse section through the trough.

A is a turn-table or any revolving mechanism supported and actuated by any approved means (not shown). Carried by this turn-table is a trough 1, which extends from the center of the turn-table in a radial direction to a point near the outer edge of the turn-table. This trough 1 is given the required slope to feed by gravity the molten material conveyed by it at the required speed, it being held rigidly in position on the turn-table by supports or equivalent means 2 for holding the trough in position. The trough itself is made of any suitable material, such as metal, and is lined with fire-clay or other heat-resisting material 3, as shown in Fig. 3.

To keep the molten glass or other material in the proper viscous flowing condition the perforated gas pipe or pipes 4 extend throughout the length of the trough, being secured just above it with holes in the lower sides to direct the gas jets directly into contact with the molten substance flowing down the trough. The gas supply pipe 5 for the swinging trough extends vertically through the axial center of the turn-table A, and a coupling 6 with a gas-tight joint is swiveled to this supply pipe 5, and it connects with the gas-pipe or pipes 4 as shown in Fig. 2.

The trough 1 just reaches these molds and successively pours a measured quantity of molten material which is severed from the main stream or mass by clippers or otherwise (not shown) stationed at the outer end of the trough.

The molten material is fed in a continuous supply from the main tank 9, through the spout 10, which also is lined with fireclay or other refractory material 11, and which also has the perforated gas-pipe system 12 for supplying heat to the flowing mass to keep it fluid enough to flow steadily and in the proper consistency. The discharge end of the spout is always just above the upper and inner end of the trough, which latter is located coincident with the center of the turn-table so that as the table turns this end is always at the center, and consequently receives from the spout and continues the flow of molten glass to the molds just beneath the lower end of said trough, so long as the machine is in operation and regardless of the position of the trough with relation to the spout.

The molded article remains in the mold preferably until just before the trough arrives again giving it plenty of time to set and sufficiently cool, and if need be, by forced jets of air, when it is tipped out upon the asbestos mat 8 of the annular ring A', where it remains for cooling until another revolution of the turn-table, when it is automatically removed and conveyed to the leer by any approved means (not shown).

It is intended that the molding plunger (not shown) shall come down upon the molten material in the mold immediately after its deposit there, but that forms no part of my present invention and hence is neither described nor shown.

I claim:

1. In molding machinery, the combination with a turn-table or revolving mechanism carrying an inclined trough which extends approximately from the center to the periphery thereof, of a spout or outlet which extends above said trough and to a point approximately coincident with the center of the table, and a plurality of molds disposed in circular form beneath the discharge end of the trough.

2. In molding machinery, the combination with a turn-table or revolving frame work carrying an inclined trough which extends approximately from the center to the periphery thereof, of a feed spout which extends above said trough and to a point approximately coincident with the center of the table, a plurality of molds disposed in circular form beneath the discharge end of the trough, and means for applying heat to the contents of the spout and trough.

3. In molding machinery, the combination with a spout, of a turn-table or rotary frame, and an inclined trough carried thereby beneath the discharge end of the spout, with a portion thereof constantly beneath the discharge end of the spout regardless of the position of the trough beneath.

4. A turn-table carrying a radially arranged trough which extends to the center of the latter, means for heating the contents of the trough and a supply pipe extending through the axial center of the rotary framework and having a swivel connection with the heating means, and a plurality of molds disposed in circular form beneath the discharge end of the trough.

In testimony whereof I affix my signature.

ANDREW H. TYSON.